United States Patent

Smith et al.

(10) Patent No.: US 9,587,977 B2
(45) Date of Patent: Mar. 7, 2017

(54) BORESIGHT ERROR MONITOR FOR LASER RADAR INTEGRATED OPTICAL ASSEMBLY

(71) Applicant: Nikon Corporation, Tokyo (JP)

(72) Inventors: Daniel G. Smith, Tucson, AZ (US); W. Thomas Novak, Redwood City, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/010,375

(22) Filed: Aug. 26, 2013

(65) Prior Publication Data

US 2014/0063491 A1    Mar. 6, 2014

Related U.S. Application Data

(60) Provisional application No. 61/695,968, filed on Aug. 31, 2012.

(51) Int. Cl.
| | |
|---|---|
| *G01J 1/00* | (2006.01) |
| *G01S 7/497* | (2006.01) |
| *G01S 7/481* | (2006.01) |

(52) U.S. Cl.
CPC ............... *G01J 1/00* (2013.01); *G01S 7/481* (2013.01); *G01S 7/497* (2013.01)

(58) Field of Classification Search
CPC .. F41G 1/30; F41G 3/323; G01S 7/481; G01S 7/497
USPC ............... 356/123, 138, 153, 614–624, 4.02, 356/139.04, 141.3–141.5, 152.1
See application file for complete search history.

(56) References Cited

U.S. PATENT DOCUMENTS

| | | | | |
|---|---|---|---|---|
| 4,896,032 | A * | 1/1990 | Ball et al. .................... 250/251 |
| 5,410,398 | A * | 4/1995 | Appert et al. ............. 356/141.3 |
| 5,457,310 | A * | 10/1995 | Fournier .................... 250/206.2 |
| 8,400,625 | B1 * | 3/2013 | Young et al. ................. 356/153 |
| 2010/0245799 | A1 * | 9/2010 | Kim ......................... G01C 3/08 356/3 |
| 2012/0188557 | A1 * | 7/2012 | Goodwin et al. ............ 356/601 |
| 2013/0194541 | A1 * | 8/2013 | Aoki et al. .................... 351/206 |

* cited by examiner

*Primary Examiner* — Tri T Ton
(74) *Attorney, Agent, or Firm* — Klarquist Sparkman, LLP

(57) ABSTRACT

Boresight and other pointing errors are detected based on a monitor beam formed by diverting a portion of a probe beam. The monitor beam is directed to a position sensitive photodetector, and the optical power received at the position sensitive photodetector is used to estimate or correct such pointing errors.

45 Claims, 10 Drawing Sheets

FIG. 7A
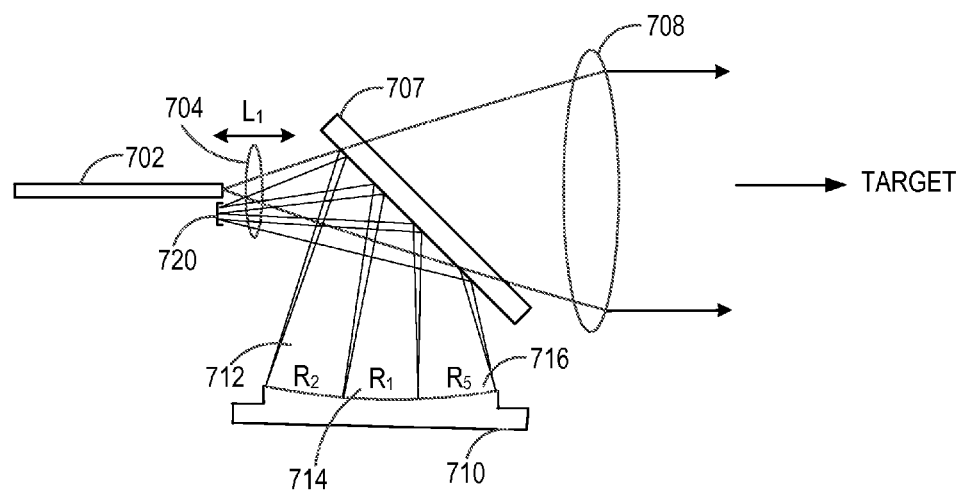
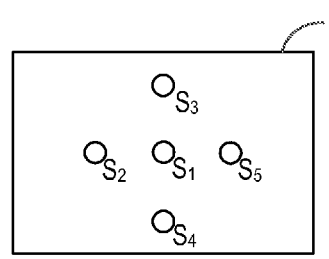
FIG. 7B
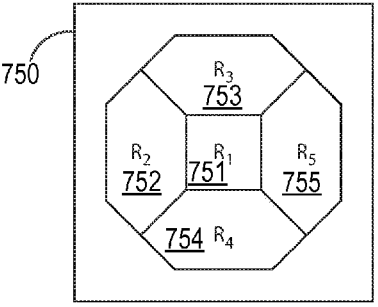
FIG. 7C

BORESIGHT ERROR MONITOR FOR LASER RADAR INTEGRATED OPTICAL ASSEMBLY

CROSS REFERENCE TO RELATED APPLICATION

This application claims the benefit of U.S. Provisional Application 61/695,968, filed Aug. 31, 2012, which is incorporated herein by reference.

FIELD

The disclosure pertains to systems and methods for improving pointing accuracy in laser radar systems.

BACKGROUND

Laser range finders often include a focus mechanism configured to focus a probe beam at various target distances. In a typical example, a beam focusing lens is translated along its axis by 25 mm to focus the probe beam at target distances ranging from 1 m to 50 m. During translation, the lens can pitch, yaw, and shift perpendicularly to the intended direction of motion. This extra motion can be referred to as "wobble" and can cause the direction of the beam to change direction. This erroneous direction variation is known as boresight error (BSE) and produces an error in measured target position. Other types of focus mechanisms, such as liquid lenses, liquid crystal lenses, and Alverez lenses may also exhibit BSE. A repeatable component of BSE can be calibrated, but an unrepeatable component can produce random errors that degrade angular precision. One approach to reducing BSE is to design a translation mechanism that has sufficiently small unrepeatable wobble, but such mechanisms can be complex and expensive. In addition, such mechanisms can fail to address other BSE errors such as those associated with temperature gradients which cause unmeasured displacements of components and changes in beam pointing direction.

SUMMARY

In some examples, methods comprise obtaining a portion of a measurement beam directed toward a target so as to provide a monitor beam. Based on a propagation direction of the monitor beam, a pointing direction of the measurement beam is detected. In some examples, the pointing direction is associated with a boresight error resulting from focusing of the measurement beam.

In other examples, laser radars comprise a measurement beam source configured to produce a measurement beam and an optical system configured to shape and focus the measurement beam at a target. A beam splitter is configured to select a portion of the measurement beam and form a monitor beam, and a photodetection system is configured to receive the monitor beam and provide an indication of a measurement beam pointing error such as boresight error.

Optical measurement systems comprise a measurement beam source configured to produce a measurement beam and a measurement beam optical system configured to direct the measurement beam at a target. A beam splitter is configured to select a portion of the measurement beam and form a monitor beam. A monitor beam photodetection system is configured to receive the monitor beam and provide an indication of a measurement beam pointing error. In some examples, the measurement beam pointing error is associated with a change in measurement beam focus. Typically, the measurement beam optical system includes a translatable focus element, and the measurement beam pointing error is associated with a translation of the focus element. In some embodiments, the translatable focus element is a lens or a retro-reflector. According to some embodiments, the measurement beam optical system includes at least one lens configured to shape the measurement for delivery to the target, and the beam splitter is situated to form the monitor beam based on the shaped measurement beam. According to other examples, the monitor beam photodetection system includes a multi-element photodetector, and the beam splitter is configured to direct the monitor beam to the multi-element detector. In still other embodiments, a monitor beam lens is situated to receive the monitor beam from the beam splitter and direct the monitor beam to the multi-element detector.

In alternative examples, the monitor beam lens includes a plurality of lens segments associated with at least two different curvatures and configured to direct monitor beam portions to respective elements of the multi-element detector. In some alternatives, the monitor beam photodetection system is configured to determine a pointing error based at least one monitor beam portion associated with a selected measurement beam focus. In some embodiments, the measurement beam source includes an optical fiber having an output surface configured to emit the measurement beam, and the monitor beam lens is situated to image the output surface of the optical fiber at the multi-element detector. In some examples, the multi-element photodetector is situated proximate the output surface of the optical fiber and is a quadrant photodetector. Alternatively, a prism having a prism edge is configured so that the monitor beam is directed at the prism edge to elements of the multi-element photodetector. In still further examples, a reflective surface is situated to reflect the monitor beam received from the beam splitter to the multi-element photodetector. According to other embodiments, the reflective surface includes a plurality of segments associated with corresponding curvatures, wherein monitor beam portions associated with the segments are directed to corresponding elements of the multi-element photodetector. According to further examples, the monitor beam photodetection system is configured to determine a pointing error based on at least one monitor beam portion associated with a selected measurement beam focus.

In further embodiments, a beam divider system is configured to receive the monitor beam from the beam splitter and direct first and second monitor beam portions to the multi-element photodetector. In some examples, the beam divider system includes a beam splitter such as a wedged plate beam splitter or a cube beam splitter situated to direct the first monitor beam portion to the multi-element photodetector, and a reflector situated to receive the second monitor beam portion and direct the second monitor beam portion to the multi-element photodetector. The reflector can be situated to direct the second monitor beam portion to the multi-element photodetector by transmission through the cube beam splitter. According to other alternatives, the beam divider system includes a cube beam splitter situated to direct the first monitor beam portion to a first reflector and the second monitor beam portion to a second reflector, and the first and second reflectors are situated to direct the first and second monitor beam portions to the multi-element photodetector. In some particular examples, the monitor beam photodetection system is configured to determine a pointing error based on interference between the first and second monitor beam portions. In still further examples, an auxiliary lens is configured to direct the first and second monitor beam portions to the multi-element photodetector. The monitor beam photodetection system can be configured to determine a pointing error based on a distribution of optical power from the first and second monitor beam portions at the multi-element photodetector. In a convenient example, the auxiliary lens is bonded to the cube beam splitter and the reflective surface is a surface of the cube beam splitter. Typically, a measurement beam photodetection system is configured to estimate at least one of a target distance or a target direction.

In some examples, the measurement beam photodetection system is configured to estimate a coordinate associated with a selected target location based on a portion of the measurement beam returned from the target and to associate the estimated coordinate with a target location. At least one of the estimated coordinate or the target location is typically adjusted based on the detected pointing error. In some examples, a dual axis rotational stage is configured to select a target location for the measurement beam, wherein the measurement beam optical system and the beam splitter are secured to the dual axis rotational stage.

Methods comprise obtaining a portion of a focused measurement beam directed toward a target so as to provide a monitor beam. Based on a propagation direction of the monitor beam, a pointing direction of the measurement beam is detected. In some examples, the pointing direction is associated with a boresight error resulting from focusing of the measurement beam. In other embodiments, the propagation direction of the monitor beam is determined by directing the monitor beam to a plurality of detector elements, and measuring monitor beam power received at each of the plurality of detector segments. In some typical examples, the detector segments are elements of a multi-element detector. According to other examples, pointing errors for a plurality of focus positions of the measurement beam are determined. In some cases, the determined pointing errors and the associated focus positions are stored in a computer readable storage device. In still further examples, a coordinate associated with a selected target location is estimated based on a portion of the measurement beam returned from the target. The estimated coordinate is associated with a target location, wherein at least one of the estimated coordinate of the target location is adjusted based on the detected pointing error. In some other examples, at least one of the estimated coordinates or target locations is adjusted based on a measurement beam focus distance. In some representative examples, the portion of a measurement beam is obtained with a beam splitter to provide the monitor beam. In still further embodiments, the monitor beam is processed so as to produce a plurality of monitor beam portions, and based on a focus distance of the measurement beam, one or more of the monitor beam portions is selected to determine the pointing error of the measurement beam. In typical examples, the monitor beam portions are associated with different wavefront curvatures or the monitor beam portions are associated with different states of polarization. In still other embodiments, the monitor beam is divided into at least a first monitor beam portion and a second monitor beam portion, and the propagation direction is estimated based on interference fringes associated with interference between the first and second monitor beam portions. In a representative example, a measurement beam pointing direction is adjusted based the estimated beam pointing direction.

Manufacturing systems comprise an optical measurement apparatus configured to determine target dimensions based on returned portions of a probe beam received from a target. A monitor beam system is configured to obtain a portion of the probe beam to produce a monitor beam, and based on the monitor beam, estimate a probe beam pointing error. In some examples, the monitor beam system includes a beam splitter configured to obtain the portion of the probe beam. In additional examples, the optical measurement apparatus is configured to vary a focus of the probe beam, and the monitor beam system is configured to estimate the probe beam pointing error based on a probe beam focus.

The foregoing and other objects, features, and advantages of the disclosed technology will become more apparent from the following detailed description, which proceeds with reference to the accompanying figures.

BRIEF DESCRIPTION OF THE DRAWINGS

FIG. 7A illustrates a pointing error detection system in which a monitor beam is divided by sub-apertures on a segmented return minor that is curved to produce focus spots on a detector positioned near a fiber that is used to deliver the probe beam to the system.

FIGS. 7B-7C illustrate monitor beam focus spot location on a detector and a suitable arrangement of detector segments, respectively, that can be used in a system such as that of FIG. 7A.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Propagating electromagnetic radiation is referred to as propagating in beams. In most applications, radiation wavelengths are between about 200 nm and 10 μm, but other wavelengths can be used. Typically a measurement beam or a probe beam is directed to a target, and a portion thereof is captured so as to provide target assessment. As used herein, multi-element photodetectors include unitary, multi-segment photodetectors formed on a common substrate, image arrays, and assemblies of discrete detectors.

Figure 1:
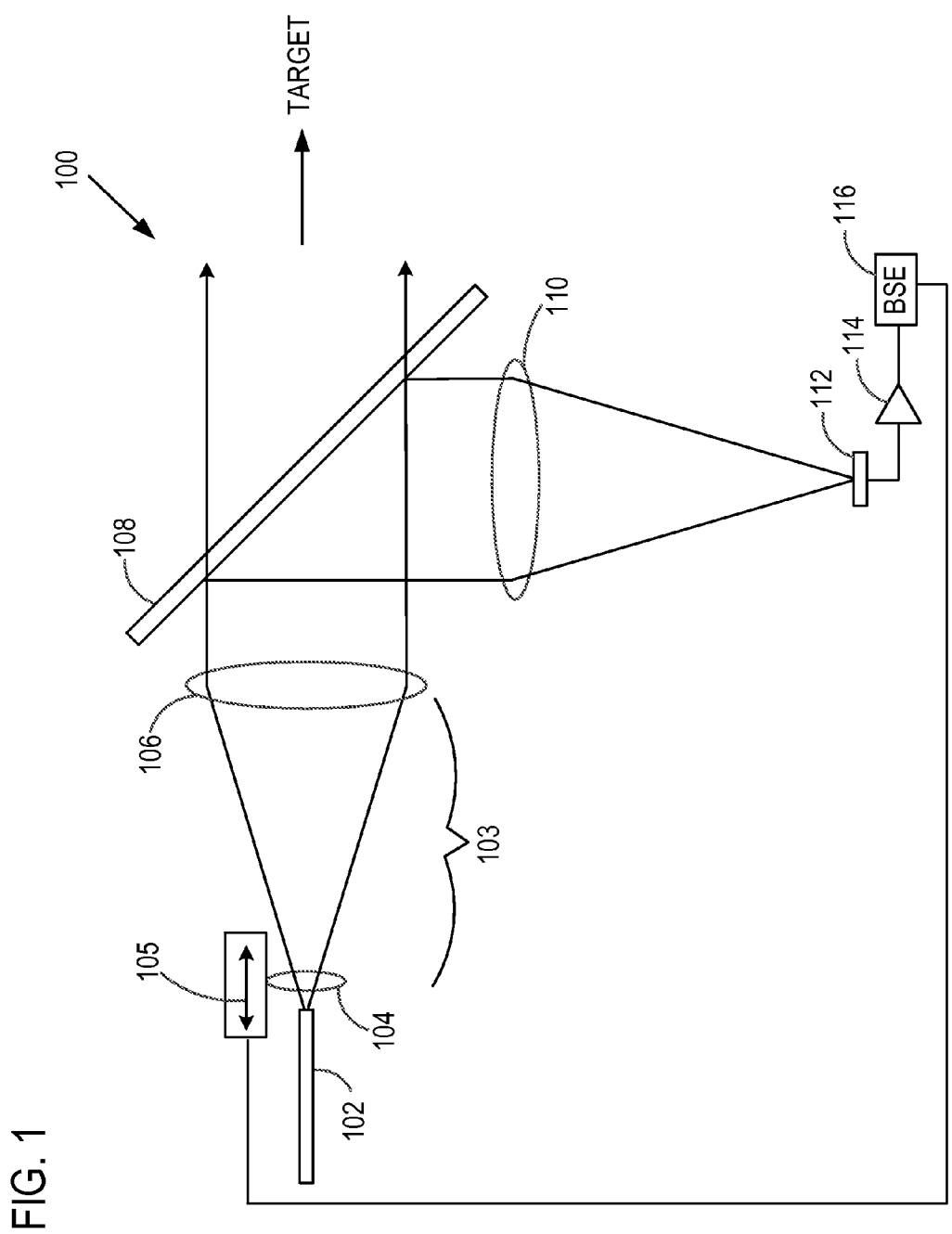
FIG. 1 illustrates a boresight error (BSE) monitoring system that includes a beam splitter and quadrant photodetector (quad-cell).

With reference to FIG. 1, a representative laser rangefinder/laser radar optical system 100 includes an optical fiber 102 situated to deliver an optical flux to a focusing objective lens assembly 103 that includes a fixed lens 106 and a moving focus (or simply "focusing") lens 104. The movable lens 104 can be translated along an axis 105 with respect to the optical fiber 102 so as to focus a probe beam at a target. A beam splitter 108 is situated to direct a portion of the probe beam to an auxiliary lens 110 and then to a position sensitive photodetector 112 such as a quadrant detector (quad-cell) or other multi-detector or multi-element photodetector assembly, or a single element position sensitive detector. The beam splitter 108 can be provided with an anti-reflection or other coating to select a fraction of the probe beam power for delivery to the photodetector 112. The auxiliary lens 110 is generally selected so as to focus the probe beam at the photodetector 112. A buffer amplifier 114 is coupled to the photodetector segments to produce electrical signals associated with respective received optical powers, and analog-to-digital convertors or other signal processing or conditioning circuitry or software can be used to provide suitable photodetector signals to an error processor 116 that provides an estimate of BSE.

Pointing errors due to BSE (or other pointing errors) result in different photodetector elements receiving varying absolute or relative optical powers so that imbalances or other spatial variations in optical power at the photodetector 112 can be used to estimate pointing error or to correct pointing error. For example, in the absence of pointing errors, the auxiliary lens 110 is configured to focus the probe beam to a probe beam spot that can be centered on the photodetector 112 so that power received at all detector segments is substantially the same. (In other examples, the probe beam power is preferentially directed to one or more of photodetector elements absent BSE).

Decentrations due to pointing errors result in differing powers at the photodetector elements that are used by the error processor 114 to detect, identify, and quantify pointing errors such as BSE. Probe beam spot size and photodetector element size are generally selected so that sufficient signal to noise ratio (SNR) is maintained throughout an intended range of focus since the size of the spot generally varies during focus. For very large or very small spots, accurate spot position estimates based on quad cell signals tend to be more difficult to obtain.

Figure 2:
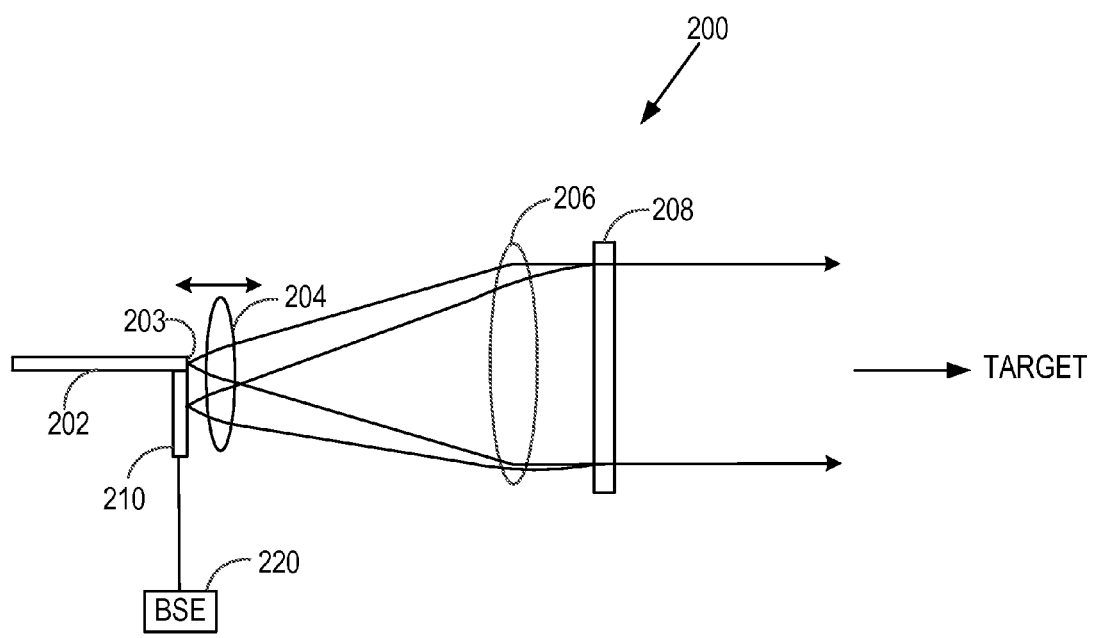
FIG. 2 illustrates a boresight error (BSE) monitoring system that includes a beam splitter configured to direct a monitor beam to a position detector situated proximate an optical fiber that provides the probe beam optical flux.

In another embodiment illustrated in FIG. 2, an optical system 200 includes an optical fiber 202 that emits a probe beam from a fiber end surface 203 to a focus (movable) lens 204 and a fixed lens 206 that are arranged to direct a probe beam to a target. A beam splitter 208 is situated on a target side of the fixed lens 206 so as to reflect a portion of the probe beam as as a monitor beam back through the fixed lens 206 and the focus lens 204. A position sensitive photodetector 210 is situated to receive the monitor beam. As shown in FIG. 2, the beam splitter 208 is tilted so that the monitor beam is focused on the position sensitive photodetector 210 placed near the fiber end surface 203. This approach can produce enhanced sensitivity for wobble detection of the lens. In such systems, beam spot size changes and beam spot shifts at the position detector are not necessarily linearly related to the BSE of the projected beam. In one example, beam spot size varies from 0.1 mm to 1 mm and spot shifts are about 1 mm during probe beam focus operations. These effects can be compensated by a processor 220 in determination of pointing errors. In the example of FIG. 2, the monitor beam is returned through the focus lens 204, but in other examples, the monitor beam is received at a detector without reaching the focus lens 204.

In some examples, a monitor beam can be split into two beams using two surfaces of a wedged beam splitter that so that two monitor beams are produced—one diverted in an x-direction the other in a y-direction. In this case, two split detectors can be used (one for each monitor beam) instead of a single quadrant detector. To deal with large shifts of the spot through focus, the beam splitter could be constructed to return two beams (one from each surface) so that one beam is deflected only in an x-direction and the other in y-direction. These two beams could be directed to two split detectors that monitor BSE in y and x respectively. In addition, linearity in BSE determination can be enhanced by providing a beam splitter tilt so that the monitor beam(s) propagate outside the aperture of the moving lens element.

Figure 3A:
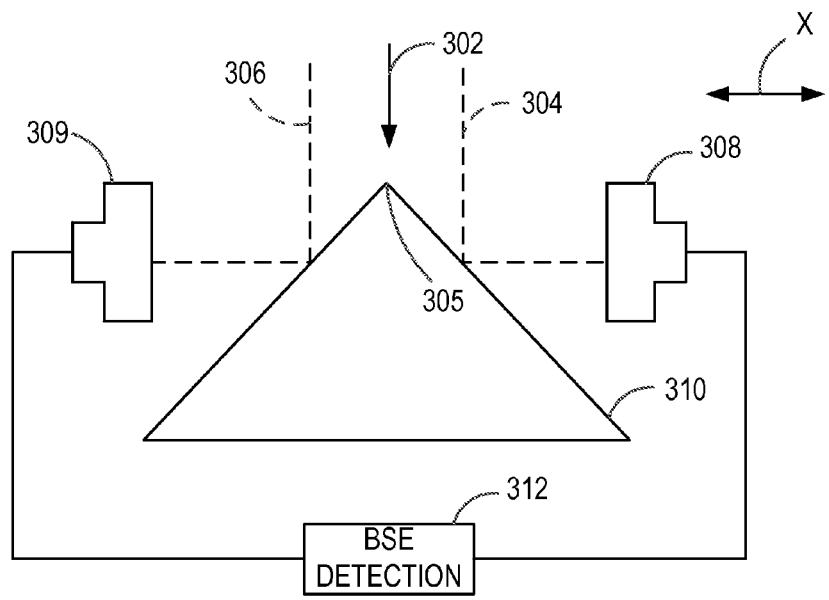
FIG. 3A is a BSE monitoring system that includes a bifurcated minor situated to direct monitor beam portions to detectors or detector segments in response to BSE.

A configuration that is less sensitive to small monitor beam spots reaching gaps between photodetector elements in quad cell or split detectors is shown in FIG. 3A. A monitor beam 302 is directed to an apex 305 of a bifurcated mirror 310 so that monitor beam portions displaced along an x-axis as shown at 304, 306 are directed by reflection to detectors 308, 309, respectively. In other examples, a prism can be used and displaced monitor beam portions directed by refraction to suitable detectors. The photodetectors 308, 309 are coupled to BSE processor 312 that provides an error estimate. Generally, effects associated with small monitor beam spots incident to a detector gap in a quad-cell (or split) detector can be reduced by directing monitor beams to a reflective or transmissive pyramid (or a roof) with sharp edges. Photodetectors are situated to receive monitor beam portions from such sharp edges, with or without additional relay optics. One additional advantage of this approach is measurement stability can be based on position stability of a glass element or other optical elements, rather than position stability of a photodetector. In some cases, stable placement of optical elements is more convenient.

Figure 3B:
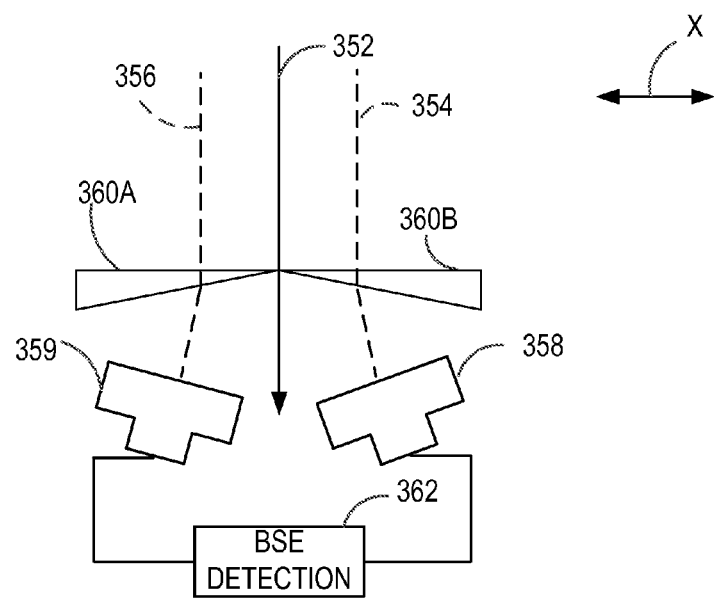
FIG. 3B is a BSE monitoring system that includes a pair of wedge prisms situated to direct monitor beam portions to detectors or detector segments in response to BSE.

A configuration using refraction instead of reflection to separate beams is illustrated in FIG. 3B. A monitor beam 352 is directed to a junction 354 of wedge prisms 360A, 360B so that monitor beam portions displaced along an x-axis as shown at 354, 356 are directed by reflection to detectors 358, 359, respectively. The photodetectors 358, 359 are coupled to BSE processor 362 that provides an error estimate.

Figure 4:
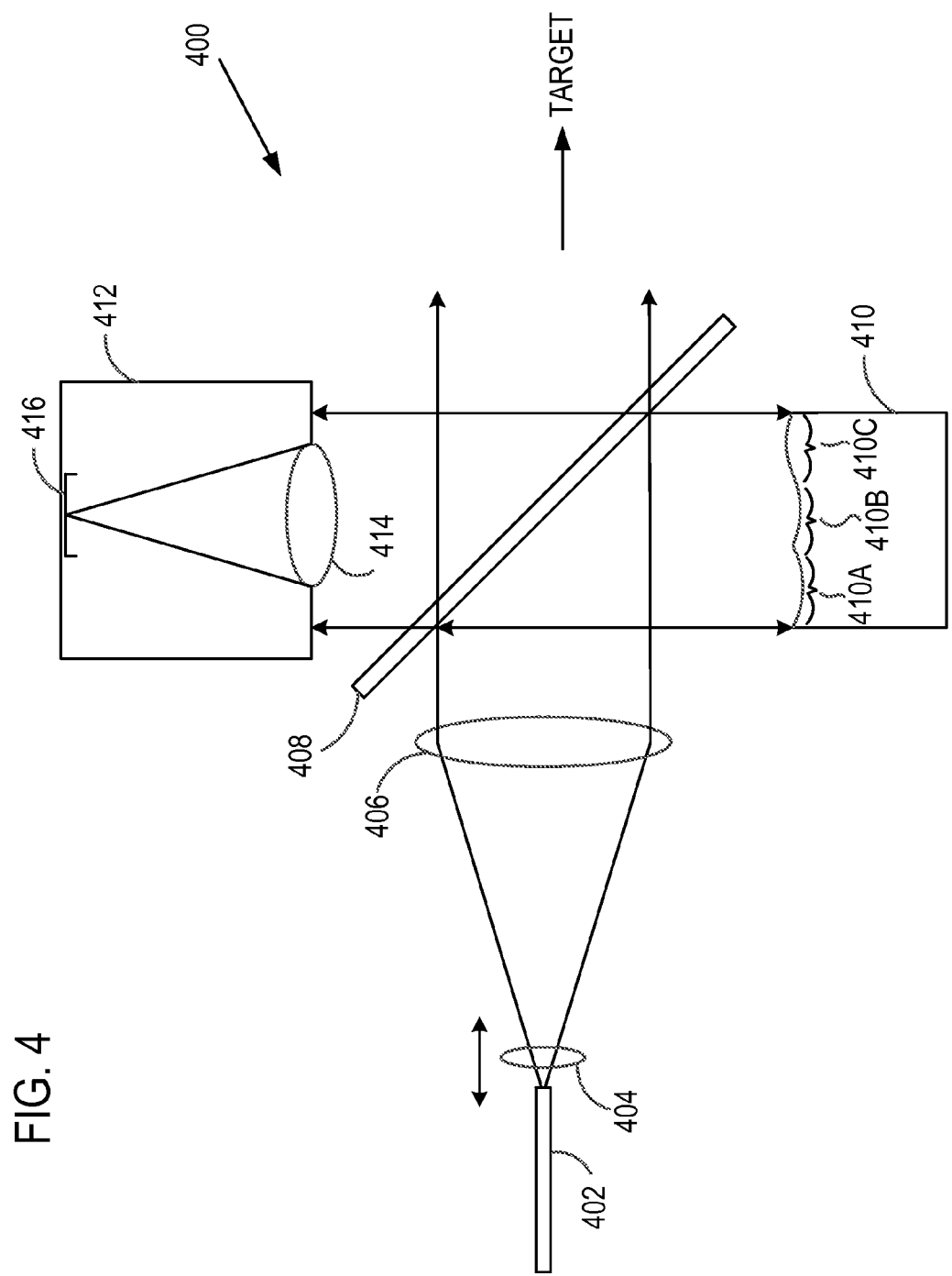
FIG. 4 illustrates a BSE monitoring system that includes a beam splitter situated so as to direct a monitor beam to a minor or retro-reflector that directs the monitor beam back through the beam splitter to a camera or other multi-element detector.

With reference to FIG. 4, an optical fiber 402 is configured to deliver an optical beam to a focus lens 404 and a fixed lens 406 that direct the optical beam to a target as a probe beam. A beam splitter 408 is situated to direct a portion of the optical beam as a monitor beam to a mirror 410 (or a retro-reflector, if additional stability is preferred) that directs the monitor beam back through the beam splitter 408 to a camera 412. As shown in FIG. 4, the mirror 410 has segments 410A-410C having different curvatures, but a planar reflective surface or other non-segmented surface can be used. The camera 412 is also situated with respect to the beam splitter 408 so as to produce an image of a target scene based on a radiation flux reflected by the beam splitter to the camera. In other examples, the beam splitter 408 is situated so that the monitor beam is reflected to the camera 412 without being redirected to traversing the beam splitter 408. The camera 412 can also detect a projected spot of light in the field of view associated with the probe beam or with a visible alignment beam provided to aid the user in pointing the probe beam. This can be mitigated with a shutter near an exit aperture, or by tilting mirror 410 and/or the beam splitter 408 so that the monitor beam is focused by a camera lens 414 at a camera sensor 416 so as to be displaced from any image spots associated with alignment beams incident on a target.

Figure 5:
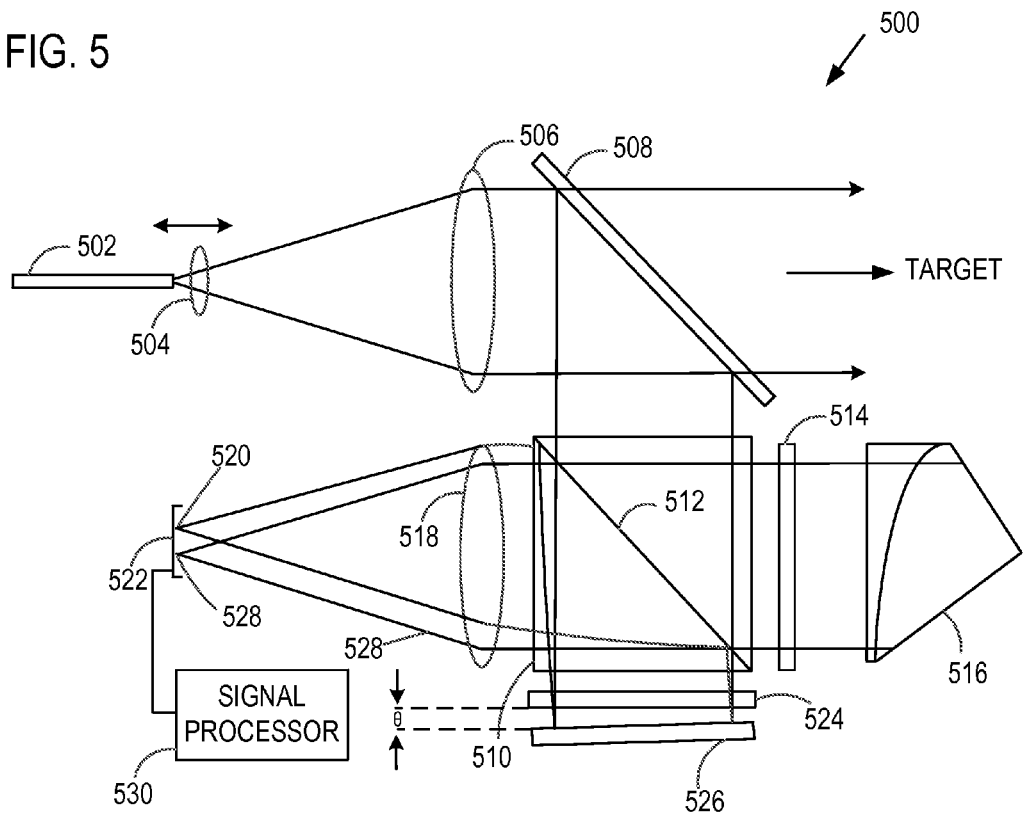
FIG. 5 illustrates a BSE monitoring system configured to produce two monitor beams with opposite parity, so that a focusing lens produces two spots that move in opposite directions on a detector for a given BSE. A polarizing beam splitter and quarter wave plates are configured to increase available monitor beam power at the detector.

With reference to FIG. 5, another representative BSE monitoring system 500 is configured to produce two monitor beams that shift in opposite directions for given BSE. In the system 500, the relative positions of two spots provide the needed information, reducing the need for camera stability. As shown in FIG. 5, an optical fiber 502 delivers an optical beam to a focus lens 504 and a fixed lens 506 that form a focused probe beam that is directed to a target. A beam splitter 508 directs a portion of the optical beam from the fiber 502 as a monitor beam to a polarizing beam splitter (PBS) 510. A reflective surface 512 of the PBS 510 directs a first portion of the monitor beam (such as ½ of the monitor beam) retro-reflector 516 such as a corner cube and a second portion to a plane mirror 526. The PBS 510 receives the first and second monitor beam portions and recombines the monitor beam portions so as to be focused by a lens 518 on a detector 522 as offset focus spots 520, 528, respectively. The retro-reflector 516 returns a monitor beam in the direction from which it was received, while any angular deviation is doubled by the plane mirror 526 so that the respective focus spots are displaced in different directions and move in opposite directions as beam pointing error increases. The detector 522 can be an imaging array such as a CCD that is coupled so a signal processor 530 that estimates the relative motions/positions of the focus spots 520, 528, so as to cancel or reduce the effects of detector motion on BSE estimation. In some examples, the plane mirror 526 is tilted so that the spots 520, 528 associated with the two monitor beam portions are always separated, even in the absence of BSE.

In other examples, first and second monitor beam focus spots can be distinguished by: 1) adding a bit of astigmatism to one monitor beam (or to both if the added astigmatisms have opposite signs), or some other phase information so the focus spots appear different; 2) making one of the focus spot have significantly lower power than the other; 3) using a liquid crystal or rotating polarizer to switching between the two monitor beams; or 4) include a shutter in one or both of the paths to switch between the two beams. If a shutter mechanism can be used to switch between the two beams, then directing both monitor spots to a common quad-cell detector can be a practical implementation.

As shown in FIG. 5, quarter wave plates (QWPs) 514, 524 are used along with the PBS 510 and a linearly polarized optical beam from the fiber 502 in order to use monitor beam power efficiently. In addition, the focus spots 520, 528 can be orthogonally polarized at the detector 522 to reduce or eliminate coherent cross-talk between the first and second monitor beams that could complicate the calculation of focus spot locations.

FIG. 5 illustrates an optical assembly that accepts the full aperture of the probe beam. This is not necessary, and a BSE monitoring system can be made more compact by intercepting only a portion of the probe beam diameter. Total volumes of around 15 mm×15 mm×30 mm or less can be realized.

Figure 6:
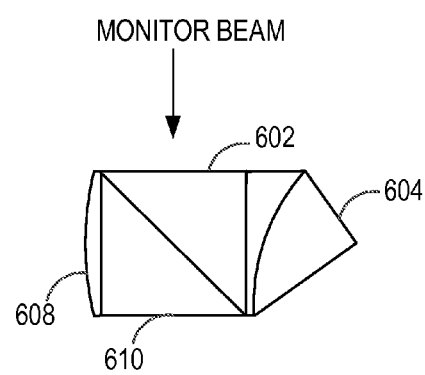
FIG. 6 illustrates a portion of a system such as that of FIG. 5 but based on a non-polarizing cube beam splitter and having a reflective surface formed on or secured to a beam splitter face, and a retro-reflector and a monitor beam focusing lens secured to respective beam splitter faces.

In other examples such as shown in FIG. 6, a non-polarizing beam splitter 602 (such as a 50/50 beam splitter) can be used if the resultant loss of monitor beam power is acceptable. A corner cube 604 is configured to direct a monitor beam portion to a monitor beam focus lens 608. A face 610 of the beam splitter 602 is provided with a reflective coating, or a separate mirror can be used. The beam splitter 610, the lens 608, and the corner cube 604 can be cemented together to make a robust, compact optical assembly.

In yet other embodiments, fringe sensing can be used. For example, using a system similar to that of FIG. 5, the monitor beam focusing lens 518 is omitted and the detector 522 is situated so as to detect fringes that are localized at an exit surface such as surface 528 of the PBS 510. If a PBS is used so that the first and second monitor beam portions have different states of polarization (SOPs) a polarizer can be used to project the polarizations into a common SOP so as to interfere. If a non-polarizing beam splitter is used, such a polarizer is not needed. For fringe-based BSE detection, an imaging detector is preferred. The direction and frequency of the fringes can be used to determine the angle between the beams with great accuracy, permitting assessment of BSE. This approach may yield very high resolution and a compact design. Fringes produced in this system may exhibit directional ambiguity, but this ambiguity can be resolved using any number of methods normally used in phase shifting interferometry. One particularly attractive set of approaches is based on providing a carrier frequency by slightly biasing the beam direction leaving the flat minor. Another approach is based on adding phase steps to the plane mirror, or introducing phase steps in a segmented waveplate after a polarizing beam splitter (if such is used), but before a polarizer. Active elements such as switchable liquid crystal devices having one more a plurality of polarization switchable elements can be used. An interferometric approach can be advantageous in that the effects of defocus can be reduced or eliminated, since both monitor beams could be made to have nominally the same curvature.

In other embodiments, a monitor beam diverted from a probe beam can be directed to a reflector that is not a single, continuous surface but a multifaceted surface with a plurality of reflective elements aligned in one or more directions or having curvatures to compensate for different focusing distances. Such a reflector need not be in a measurement optical path, and is preferably stable, but not necessarily of high quality. For example, such an optical element could be replicated inexpensively using an electro-forming process or with a computer generated hologram, which could also be stamped. Different facets could be incorporated for other kinds of tests or feedback.

With reference to FIG. 7A, a fiber 702 is configured to direct an optical beam to a movable lens 704 and fixed lens 708 to produce a probe beam that is directed to a target. A beam splitter 707 reflects a portion of the optical beam to form a monitor beam that is incident to a reflector 710 that includes reflecting segments 712, 714, 716 having radii of curvature $R_2$, $R_1$, $R_5$. In other examples, a segment refractive element having a plurality of spherical, cylindrical, or other shapes or curvatures can be used.

Each of the segments 712, 714, 716 can be configured to permit measurement of the monitor beam under different conditions. Corresponding monitor beam portions are directed to a detector 720. A shown in FIG. 7A, each of the segments 712, 714, 716 is tilted slightly so that the corresponding monitor beam portions are received at different locations at the detector 720 and have different wavefront curvatures. In this configuration, the position and properties of each monitor beam portion can be measured without interference from monitor beam portions associated with different segments. While an imaging detector such as a CMOS focal plane array can be used, multiple detectors can be used. For example, a dedicated detector can be provided for each reflecting segment.

FIG. 7B illustrates a representative arrangement of monitor beam spots ($S_1$-$S_5$) formed with a 5-segment reflector. Multi-segmented reflectors can also be provided in other embodiments such as in the example of FIG. 5. The monitor beam spots $S_1$-$S_5$ are shown as about the same size for convenient illustration. Depending on the associated minor segment curvatures, the monitor beam spots $S_1$-$S_5$ may have substantially different sizes. A suitable detector is shown in FIG. 7C, with detector segments 751-755 corresponding to monitor beam spots $S_1$-$S_5$ that are associated with mirror segment curvatures $R_1$-$R_5$.

In one example of a segmented mirror system, the segment $R_1$ can be almost flat and selected so that monitor beam flux incident to RI is returned to form a spot at position $S_1$ at the detector when the focusing lens is set to near the maximum range of focus of the probe beam, for example, 60 meters. Segments $R_2$ and $R_5$ are selected so that they direct monitor light flux to positions $S_2$ and $S_5$ on the detector, and have increased spherical curvatures so that when the lenses 704, 708 are configured to focus near a minimum distance, the monitor beam will come to a sharp focus at $S_2$ and $S_5$. Reflector segments associated with radii of curvature $R_3$ and $R_4$ are configured for an in-between focal range setting. Thus, better signal-to-noise ratio is obtained over the full range of instrument focus compared to a single reflecting surface, which is typically selected to correspond to a single focus distance.

Many other examples using segmented reflectors or lenses are possible. For example, a minor segment of radius of curvature $R_2$ could direct a monitor beam to a mirror (not shown in FIG. 7A) situated next to the detector 720 and arranged so as to reflect a received portion of the monitor beam to a minor segment of radius of curvature $R_5$ which then directs the flux to the detector 720. Such a double reflection can double measurement sensitivity. In some cases, such arrangements can produce large non-linearities, but these can be accommodated by calibration. One or more or all segments can be associated with single or double or additional reflections.

Figure 8:
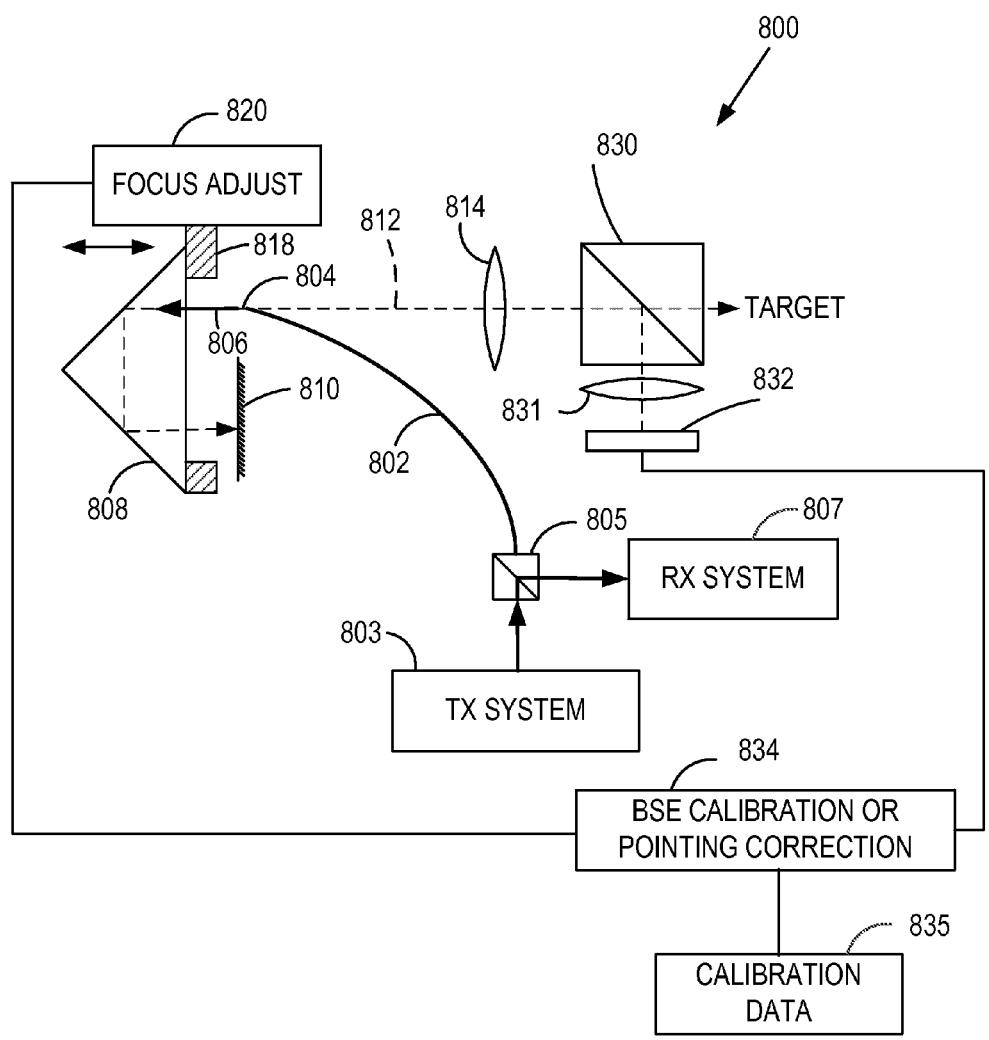
FIG. 8 is a schematic diagram of a laser radar system that includes a corner cube that is translatable to provide beam focus adjustments.

A portion of another representative laser radar system is illustrated in FIG. 8 in which beam focus is achieved by translation of a corner cube. An optical fiber 802 includes an emitter surface 804 configured to provide an optical beam 806 that is directed to a corner cube 808 (shown as a right angle prism in FIG. 8 for convenient illustration). The optical fiber 802 is typically coupled to a transmit system 803 with a beam splitter 805 such as a fiber coupler. The transmit system 803 typically includes one or more lasers or other light sources that are not shown in FIG. 8. It is generally convenient to select the fiber 802 and a measurement beam wavelength so the optical beam emitted by the fiber 802 is propagating in a lowest order mode of the fiber, but higher order modes can be used. A visible wavelength alignment beam can be similarly selected. In some examples, the fiber 802 is selected to be single mode at about 1550 nm so that a 1550 nm measurement beam propagates in a single, lowest order mode and the visible alignment beam propagates in only a few fiber modes. A receiver system 807 is also coupled to the fiber 802 with the beam splitter 805. A cube beam splitter is shown in FIG. 8 for convenience, but other arrangements including fiber couplers can be used.

The corner cube 808 directs the emitted beam to a reflector 810 and the beam is then reflected so as to propagate along an axis 812 to a beam forming lens 814. The corner cube 808 is secured to a translation stage 818 that is moveable under the direction of a focus controller 820. Adjustment of a displacement of the corner cube 808 along the axis 812 permits focusing of the optical beam at a target.

A beam splitter cube 830 is situated to produce a monitor beam that is directed to a monitor beam focusing lens 831 and a segmented detector 832 that is coupled to a BSE calibration or detection system 834 that is configured to provide an estimate of pointing error (typically as a function of probe beam focus) that can be used to identify a current pointing direction or used to orient the laser radar assembly so as to point in a selected direction. Calibration data can be stored in a memory 835. Typically, the laser radar assembly (or at least the optical components thereof) is fixed to a gimbal mount (not shown) that can be used to steer the probe beam to a target location.

Figure 9:
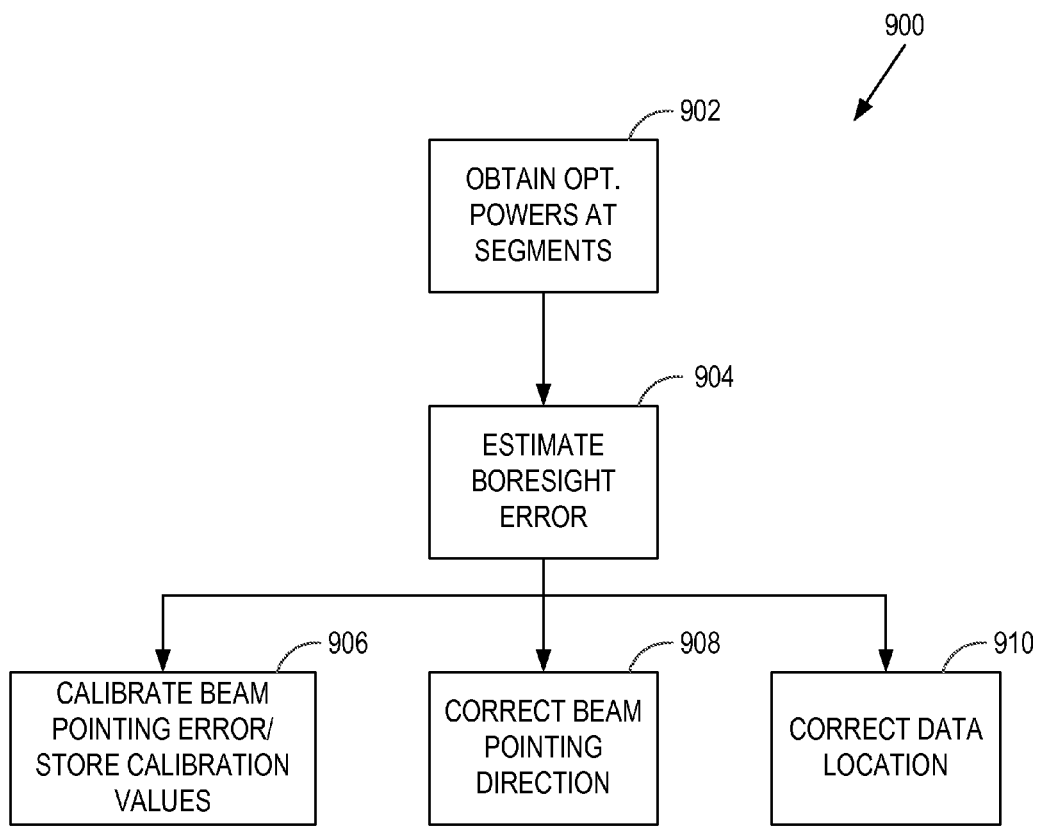
FIG. 9 is a block diagram illustrating representative methods associated with BSE measurements.

A representative method 900 is illustrated in FIG. 9. At 902, monitor beam power is measured at a plurality of locations, typically with corresponding detectors. At 904, boresight error is estimated based on the measured powers using error values associated with monitor beam power differences between segments. Based on boresight error determination, a probe beam pointing direction can be adjusted at 908. Alternatively, at 906, boresight error can be stored in a computer readable device such as computer memory in a calibration procedure so that boresight error can be compensated as the probe beam is directed to a target. Boresight error is generally estimated for a plurality of probe beam focus distances so that a full focus range can be calibrated. In another alternative 910, measured data for a particular location is reassigned to an adjusted location based on current boresight error measurement or stored boresight error data. If a segmented monitor beam is used such as obtained with a segmented reflector, a particular monitor beam focus spot can be selected based on a focus setting of the probe beam. Boresight error estimates and calibration are then based on the selected monitor beam focus spot (or spots).

Figure 10:
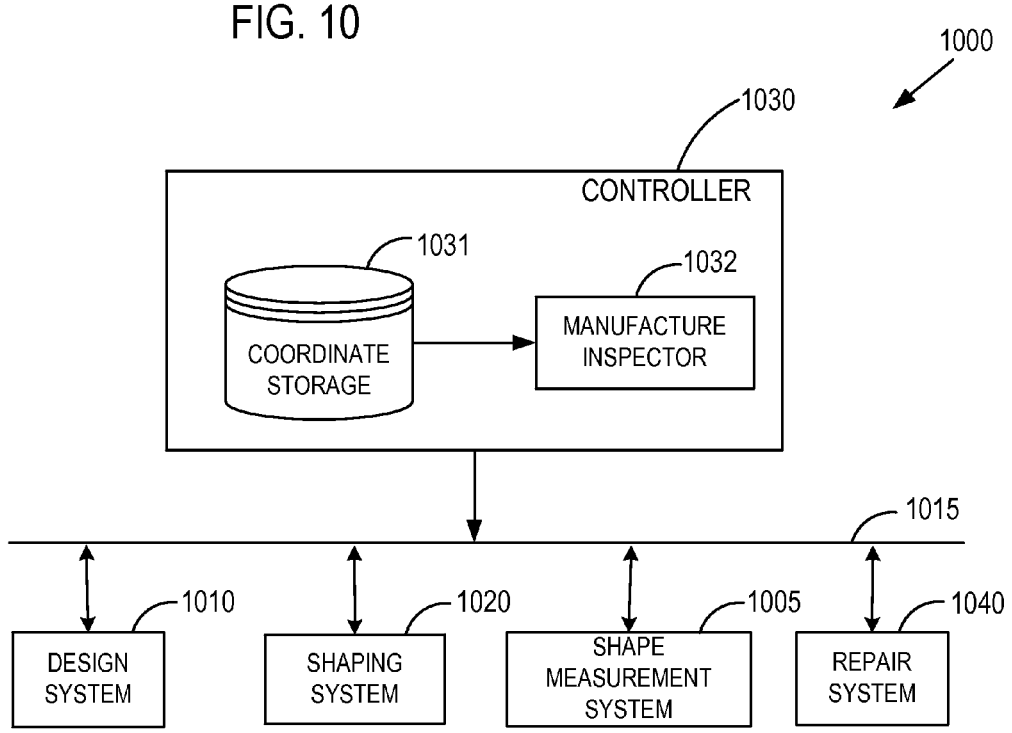
FIG. 10 is a block diagram of a representative manufacturing system that includes a laser radar or other profile measurement system to manufacture components, and assess whether manufactured parts are defective or acceptable.
Figure 11:
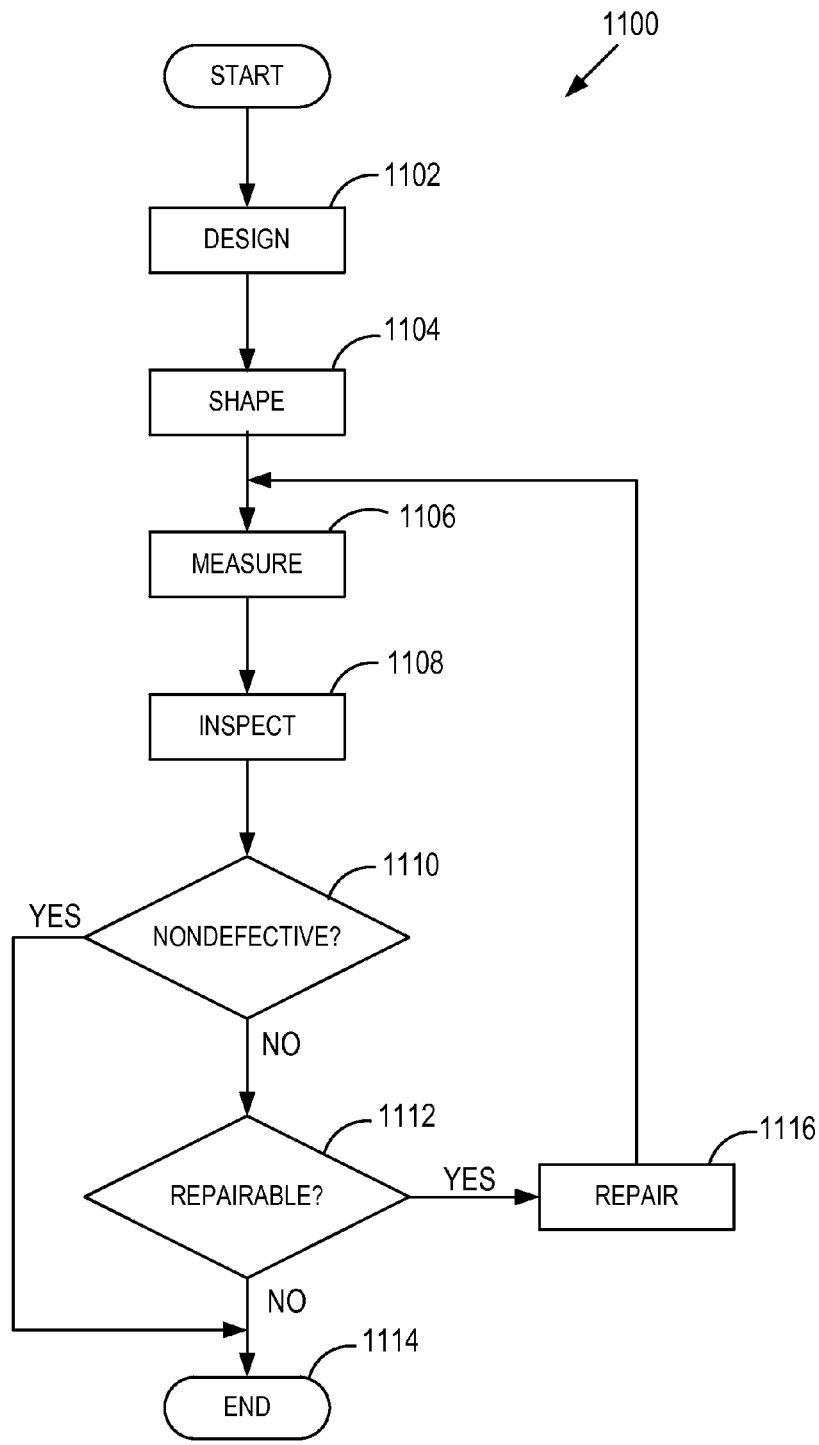
FIG. 11 is a block diagram illustrating a representative manufacturing method that includes profile measurement to determine whether manufactured structures or components are acceptable, and if one or more such manufactured structures can be repaired.

Representative systems and methods that can include BSE and other error detection and correction are shown in FIGS. 10-11. FIG. 10 illustrates a representative manufacturing system 1000 suitable for producing one or more components of a ship, airplane, or part of other systems or apparatus, and for evaluating and reprocessing such manufactured components. The system 1000 typically includes a shape or profile measurement system 1005 such as the laser radar discussed above. The manufacturing system 1000 also includes a design system 1010, a shaping system 1020, a controller 1030, and a repair system 1040. The controller 1030 includes coordinate storage 1031 configured to store measured and design coordinates or other characteristics of one or more manufactured structures as designed and/or measured. The coordinate storage 1031 is generally a computer readable medium such as hard disk, random access memory, or other memory device. Typically, the design system 1010, the shaping system 1020, the shape measurement system 1005, and a repair system 1040 communicate via a communication bus 1015 using a network protocol.

The design system 1010 is configured to create design information corresponding to shape, coordinates, dimensions, or other features of a structure to be manufactured, and to communicate the created design information to the shaping system 1020. In addition, the design system 1010 can communicate design information to the coordinate storage 1031 of the controller 1030 for storage. Design information typically includes information indicating the coordinates of some or all features of a structure to be produced.

The shaping system 1020 is configured to produce a structure based on the design information provided by the design system 1010. The shaping processes provided by the shaping system 1020 can include casting, forging, cutting, or other process. The shape measurement system 1005 is configured to measure the coordinates of one or more features of the manufactured structure and communicate the information indicating measured coordinates or other information related to structure shape to the controller 1030.

A manufacture inspector 1032 of the controller 1030 is configured to obtain design information from the coordinate storage 1031, and compare information such as coordinates or other shape information received from a profile measuring apparatus such as the apparatus described above, including BSE compensation, calibration, or beam point adjustment, with design information read out from the coordinate storage 1031. The manufacture inspector 1032 is generally provided as a processor and a series of computer-executable instructions that are stored in a tangible computer readable medium such as random access memory, a flash drive, a hard disk, or other physical devices. Based on the comparison of design and actual structure data, the manufacture inspector 1032 can determine whether or not the manufacture structure is shaped in accordance with the design information, generally based on one or more design tolerances that can also be stored in the coordinate storage 1031. In other words, the manufacture inspector 1032 can determine whether or not the manufactured structure is defective or nondefective. When the structure is not shaped in accordance with the design information (and is defective), then the manufacture inspector 1032 determines whether or not the structure is repairable. If repairable, then the manufacture inspector 1032 can identify defective portions of the manufactured structure, and provide suitable coordinates or other repair data. The manufacture inspector 1032 is configured to produce one or more repair instructions or repair data and forward repair instructions and repair data to the repair system 1040. Such repair data can include locations requiring repair, the extent of re-shaping required, or other repair data. The repair system 1040 is configured to process defective portions of the manufactured structure based on the repair data.

FIG. 11 is a flowchart showing a representative manufacture method 1100 that can incorporate manufacturing systems such as illustrated in FIG. 10. At 1102, design information is obtained or created corresponding to a shape of a structure to be manufactured. At 1104, the structure is manufactured or "shaped" based on the design information. At 1106, coordinates, dimensions, or other features of the manufactured structure are measured with a profile measurement system such as the laser radar systems described above to obtain shape information corresponding to the structure as manufactured. Typically, profile measurement is accomplished with a fine scan and a coarse scan of a laser beam. At 1108, the manufactured structure is inspected based on a comparison of actual and design dimensions, coordinates, manufacturing tolerance, or other structure parameters. At 1110, if the manufactured structure is determined to be nondefective, the manufactured part is accepted and processing ends at 1114. If the manufactured part is determined to be defective at 1110 by, for example, the manufacture inspector 1032 of the controller 1030 as shown in FIG. 10, then at 1112 it can be determined whether the manufacture part is repairable. If repairable, the manufactured part is reprocess or repaired at 1116, and then measured, inspected, and reevaluated at 1106, 1108, 1110, respectively. If the manufactured part is determined to be unrepairable at 1112, the process ends at 1114.

According to the method of FIG. 11, using a profile measurement system to accurately measure or assess coordinates or other features of a manufactured structure, a manufactured structure can be evaluated to determine if the structure is defective or nondefective. Further, if a manufactured structure is determined to be defective, a reprocessing process can be initiated if the part is deemed to be repairable based on design and actual structure dimensions and features. By repeating the measurement, inspection, and evaluation processes, defective parts can be reprocessed, and parts that are defective but that are not repairable can be discarded. The particular systems and methods of FIGS. 10-11 are exemplary only, and other arrangements can be used.

In the above embodiment, the structure manufacturing system 1100 can include a profile measuring system such as the laser radar and laser tracking systems disclosed above, the design system 1010, the shaping system 1020, the controller 1030 that is configured to determine whether or not a part is acceptable (inspection apparatus), and the repair system 1040. However, other systems and methods can be used and examples of FIGS. 10 and 11 are provided for convenient illustration.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An optical measurement system for determining a target dimension, comprising:
    a measurement beam source configured to produce a measurement beam;
    a measurement beam optical system configured to direct the measurement beam at a target, the measurement beam optical system including a moveable focus element for focusing the measurement beam at the target;
    a beam splitter configured to select a portion of the measurement beam after propagating through the moveable focus element so as to form a monitor beam;
    a monitor beam photodetection system configured to receive the monitor beam and provide an indication of a measurement beam pointing error that is associated with the movement of the moveable focus element; and
    a measurement beam photodetection system configured to estimate the target dimension and a coordinate associated with a target location of the target based on a portion of the measurement beam returned from the target, wherein at least one of the estimated coordinate or the target location is adjusted based on the indicated pointing error.

2. The optical measurement system of claim 1, further comprising a bifurcated mirror configured to direct at least portions of the monitor beam to the monitor beam detection system.

3. The optical measurement system of claim 1, wherein the moveable focus element is a corner cube.

4. The optical measurement system of claim 1, wherein the measurement beam optical system includes at least one lens configured to shape the measurement for delivery to the target, and the beam splitter is situated to form the monitor beam based on the shaped measurement beam.

5. The optical measurement system of claim 4, wherein the monitor beam photodetection system includes a multi-element photodetector, and the beam splitter is configured to direct the monitor beam to the multi-element detector.

6. The optical measurement system of claim 5, further comprising a monitor beam lens situated to receive the monitor beam from the beam splitter and direct the monitor beam to the multi-element detector.

7. The optical measurement system of claim 6, wherein the monitor beam lens includes a plurality of lens segments associated with at least two different curvatures and configured to direct monitor beam portions to respective elements of the multi-element detector.

8. The optical measurement system of claim 5, wherein the monitor beam photodetection system is configured to determine a pointing error based at least one monitor beam portion associated with a selected measurement beam focus.

9. The optical measurement system of claim 5, wherein the measurement beam source includes an optical fiber having an output surface configured to emit the measurement beam, and the monitor beam lens is situated to image the output surface of the optical fiber at the multi-element detector.

10. The optical measurement system of claim 9, wherein the multi-element photodetector is situated proximate the output surface of the optical fiber.

11. The optical measurement system of claim 5, wherein the multi-element photodetector is a quadrant photodetector.

12. The optical measurement apparatus of claim 6, further comprising a prism, wherein the monitor beam is situated to be directed at the prism so as to couple portions of the monitor beam to respective elements of the multi-element photodetector.

13. The optical measurement system of claim 5, further comprising a reflective surface situated to reflect the monitor beam received from the beam splitter to the multi-element photodetector.

14. The optical measurement system of claim 13, wherein the reflective surface includes a plurality of segments associated with corresponding curvatures, wherein monitor beam portions associated with the segments are directed to corresponding elements of the multi-element photodetector.

15. The optical measurement system of claim 14, wherein the monitor beam photodetection system is configured to determine a pointing error based at least one monitor beam portion associated with a selected measurement beam focus.

16. The optical measurement system of claim 5, further comprising a beam divider system configured to receive the monitor beam from the beam splitter and direct first and second monitor beam portions to the multi-element photodetector.

17. The optical measurement system of claim 16, wherein the beam divider system includes a cube beam splitter situated to direct the first monitor beam portion to the multi-element photodetector, and a reflector situated to receive the second monitor beam portion and direct the second monitor beam portion to the multi-element photodetector.

18. The optical measurement system of claim 17, wherein the reflector is situated to direct the second monitor beam portion to the multi-element photodetector by transmission through the cube beam splitter.

19. The optical measurement system of claim 16, wherein the beam divider system includes a cube beam splitter situated to direct the first monitor beam portion to a first reflector and the second monitor beam portion to a second reflector, and the first and second reflectors are situated to direct the first and second monitor beam portions to the multi-element photodetector.

20. The optical measurement system of claim 19, wherein the monitor beam photodetection system is configured to determine a pointing error based on interference between the first and second monitor beam portions.

21. The optical measurement system of claim 19, further comprising an auxiliary lens configured to direct the first and second monitor beam portions to the multi-element photodetector.

22. The optical measurement system of claim 21, wherein the monitor beam photodetection system is configured to determine a pointing error based on a distribution of optical power from the first and second monitor beam portions at the multi-element photodetector.

23. The optical measurement system of claim 22, wherein the auxiliary lens is bonded to the cube beam splitter and the reflective surface is a surface of the cube beam splitter.

24. The optical measurement apparatus of claim 1, further comprising a dual axis rotational stage configured to select a target location for the measurement beam, wherein the beam measurement beam optical system and the beam splitter are secured to the dual axis rotational stage.

25. A measurement method for determining a target dimension, comprising:
    obtaining a portion of a measurement beam directed toward a target from a moveable focus element situated to focus the measurement beam at the target, wherein the portion obtained provides a monitor beam;
    based on a propagation direction of the monitor beam, detecting a pointing direction of the measurement beam associated with a movement of the moveable focus element and determining a pointing error of the measurement beam that is associated with the movement of the moveable focus element; and
    estimating a coordinate associated with a selected location of the target and a dimension of the target based on a portion of the measurement beam returned from the target;
    wherein at least one of the estimated coordinate or the selected target location is adjusted based on the determined pointing error.

26. The method of claim 25, wherein the pointing direction is associated with a boresight error resulting from focusing, shaping, or pointing of the measurement beam.

27. The method of claim 25, further comprising determining the propagation direction of the monitor beam by directing the monitor beam to a plurality of detector elements, and measuring monitor beam power received at each of the plurality of detector segments.

28. The method of claim 27, wherein the detector segments are elements of a multi-element detector.

29. The method of claim 27, further comprising determining pointing errors for a plurality of focus positions of the measurement beam.

30. The method of claim 29, further comprising storing the determined pointing errors and the associated focus positions in a computer readable storage device.

31. The method of claim 26, further comprising determining the propagation direction of the monitor beam by directing the monitor beam to a position sensitive detector, and measuring monitor beam power received at the position sensitive detector.

32. The method of claim 25, wherein at least one of the estimated coordinate or the target location is adjusted based on a measurement beam focus distance.

33. The method of claim 25, wherein the portion of a measurement beam is obtained with a beam splitter to provide the monitor beam.

34. The method of claim 33, wherein the monitor beam is processed so as to produce a plurality of monitor beam portions, and based on a focus distance of the measurement beam, selecting one or more of the monitor beam portions to determine the pointing error of the measurement beam.

35. The method of claim 34, wherein the monitor beam portions are associated with different wavefront curvatures.

36. The method of claim 35, wherein the monitor beam portions are associated with different states of polarization.

37. The method of claim 25, wherein the monitor beam is divided into at least a first monitor beam portion and a second monitor beam portion, and the propagation direction is estimated based on interference fringes associated with interference between the first and second monitor beam portions.

38. The method of claim 25, further comprising adjusting a measurement beam pointing direction based the estimated beam pointing direction.

39. The method of claim 25, wherein the monitor beam is obtained with a beam splitter.

40. An optical measurement apparatus for determining a target dimension, comprising:
    a moveable focus element secured to a moveable stage so as to direct and focus a probe beam at a target;
    a probe beam photodetection system situated to determine the target dimension based on returned portions of the focused probe beam received from the target; and
    a monitor beam system configured to obtain a portion of the focused probe beam to produce a monitor beam, and based on the monitor beam, estimate a probe beam pointing error associated with a movement of the moveable focus element with the moveable stage;
    wherein the probe beam photodetection system is situated to estimate a coordinate associated with a selected location of the target based on a portion of the probe beam returned from the target, wherein at least one of the estimated coordinate or the selected location is adjusted based on the estimated probe beam pointing error.

41. The optical measurement apparatus of claim 40, wherein the monitor beam system includes a beam splitter configured to obtain the portion of the probe beam.

42. The optical measurement system of claim 1, wherein the moveable focus element is a lens.

43. The optical measurement system of claim 1, wherein the moveable focus element is situated to move along an optical axis of the measurement beam optical system so as to focus the measurement beam at the target.

44. The measurement method of claim 25, wherein the moveable focus element is situated to move along an optical axis of the measurement beam optical system so as to focus the measurement beam at the target.

45. The optical measurement apparatus of claim 40, wherein the moveable focus element is situated to move along an optical axis of the measurement beam optical system so as to focus the probe beam at the target.

* * * * *